May 23, 1961  H. HAUPTVOGEL ET AL  2,985,066
ENLARGING APPARATUS WITH SHARP FOCUSSING FOR SEVERAL
LENSES OF DIFFERENT FOCAL LENGTH
Filed Nov. 13, 1957  2 Sheets-Sheet 1

INVENTORS
Herbert Hauptvogel
AND
Erich Korf
BY

INVENTOR.
Herbert Hauptvogel
AND
BY Erich Korf

United States Patent Office 2,985,066
Patented May 23, 1961

2,985,066

ENLARGING APPARATUS WITH SHARP FOCUSSING FOR SEVERAL LENSES OF DIFFERENT FOCAL LENGTH

Herbert Hauptvogel, and Erich Korf, Dresden, Germany, assignors to VEB Kamera- und Kinowerke Dresden Filed Nov. 13, 1957, Ser. No. 696,108

Claims priority, application Germany Dec. 14, 1956

5 Claims. (Cl. 88—24)

This invention relates to enlarging apparatuses, in which lenses of different focal lengths can be selectively used and to an arrangement for automatic sharp focusing of these lenses.

Enlarging apparatuses are known which permit selective use of lenses of different focal lengths and which are provided with means for controlling sharp focusing of the lens employed for enlarging. In these known apparatuses the lenses are interchangeably arranged and for this purpose secured in guide plates by means of which they can be inserted in and removed from the lens carrier. Focusing is controlled by a multiple-linked lever system actuated by a parallelogram guide and adjustable to the lens used during enlarging by means of a special coupling. In another apparatus this adjustment is made during insertion of the lens by the guide plate, coupling being effected in the course of this motion by way of an intermediate lever.

These known kinds of sharp focusing by way of a lever system controlled by a parallelogram gear and its coupling to the selectively used lenses of different focal lengths require a complicated structure. Owing to the cooperation of numerous levers and links, errors in transmission occur which cause inaccuracies during sharp focusing and enlarging. Furthermore, alternating coupling for sharp focusing by means of the lens guide demands a structure particularly adapted to the selective adjustment to the different lenses. These known apparatuses are open also to the objection that alternate coupling or changing over of the gear for sharp focusing of the different lenses does not compensate the difference in vertical adjustment which exists when lenses of different focal lengths are used.

The known apparatuses require therefore additional lifting or lowering of the lens carrier during changing of the lenses according to their different focal lengths, since otherwise coupling of the sharp focusing device is hindered or rendered impossible.

The present invention eliminates these drawbacks in a simple and reliable manner by arranging the different lenses on a common control head and assigning to each lens an automatic sharp focusing device adapted thereto, which are selectively controllable by a common member in such manner that differences in focal length are simultaneously compensated for the operating lens and automatic focusing for the inoperative lenses is discontinued and disconnected. The automatic sharp focusing means assigned to the different lenses have their seating on the vertically movable support of the enlarging system and comprise movably disposed toggle levers which engage the vertically movable and adjustable lens carrier and are controlled by cams preferably provided on the standard of the enlarging apparatus. For each lens an automatic sharp focusing device consisting of a cam and a toggle lever is provided so that during vertical motion of the enlarging apparatus sharp focusing of the assigned lens is simultaneously controlled.

Automatic sharp focusing is controlled by a member constructed as an eccentric serving also as a bearing for the toggle lever of one of the sharp focusing devices. Lift and turning range of this eccentric are such that the toggle lever can be swung away from the lens carrier or articulated towards it so that the difference in focal length of the operating lens is simultaneously compensated. At the change of this position the lens carrier is placed on the toggle lever of the other sharp focusing device which thus becomes effective and simultaneously compensates the difference in focal length of the assigned lens. When, therefore, several lenses of different focal lengths are provided, the difficult and complicated operation of automatic sharp focusing with simultaneous compensation of the difference in focal length is performed each time by a single disconnectable lever in connection with a correspondingly adjusted cam, whereby besides a simple design a reliable mode of operation is ensured.

The accompanying drawings diagrammatically illustrate an embodiment of the invention, parts and details not required for understanding the invention being omitted.

Figure 1:
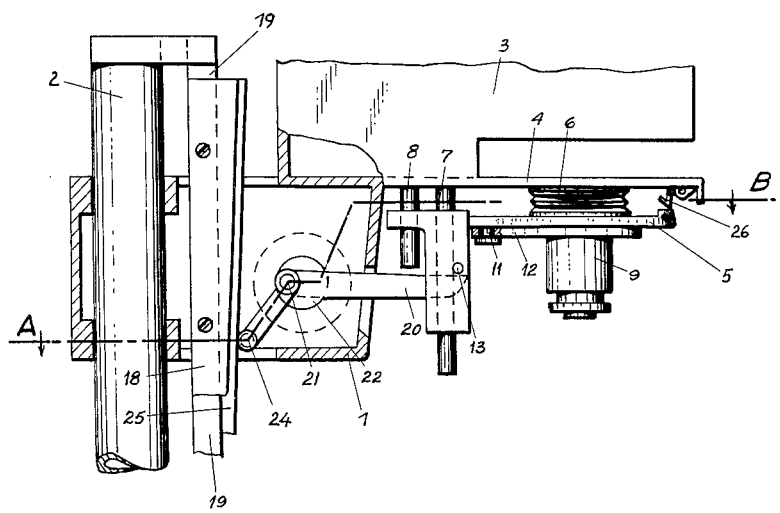
Figure 1 is a side view, partly in section, of the construction according to the invention.

The support 1 of the enlarging system is movable in vertical direction and guided by standard 2, the latter preferably having the form of a round column. The enlarging system substantially comprises a light housing 3, a negative support 4 and a lens carrier 5 connected light-tight to the negative support 4 by a bellows 6. The lens carrier 5, also movable in vertical direction, is guided by guide rods or bearing bolts 7, 8 secured to the support 1. The lenses 9, 10 have different focal lengths and are arranged on a control head 12 movable about a fulcrum 11 in such a way that alternately one or the other lens can be moved into operating position under the negative. At one side of the lens carrier 5 a pin 13 is fastened and on the other side a pin 14 which is engaged by one arm of a toggle lever or crank 15 disposed about a fulcrum 16 on the support 1 and biasing a slide roller 17 of its other arm bearing against a cam 18 which is secured to a rail 19 held by the standard 2. The pin 13 is engaged by one arm of a toggle lever or crank 20 pivotally mounted on an eccentric 21 of a control shaft 22 which has its bearing in the support 1 and can be actuated by a handle or knob 23. With its other arm toggle lever 20 bears with a slide roller 24 against a cam 25 secured to the rail 19 held by the column 2.

Figure 2:
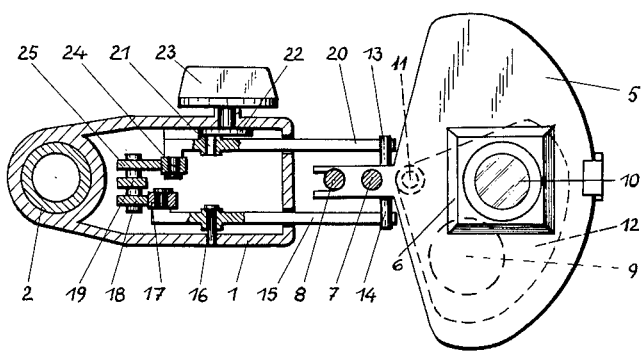
Fig. 2 is a section AB of Fig. 1.
Figure 3:
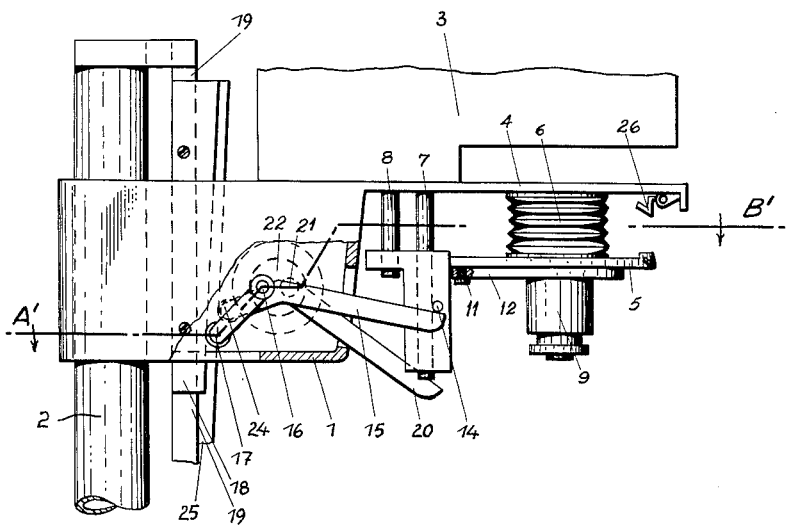
Figs. 3 and 4 are respectively a side view and a section A'B'.
Figure 4:
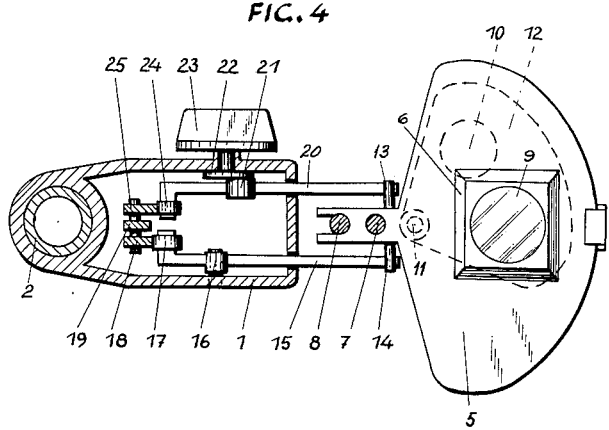

The mode of operation is as follows:

Assumed the lens 10 is in operating position for enlargement and has assigned to it the automatic sharp focusing device which can be connected and disconnected by the knob 23, the various parts being in the position shown in Figs. 1 and 2. When the toggle lever 20 on the eccentric 21 is in the operative position indicated in Fig. 1, it effects movement of the lens carrier 5 through pin 13 in accordance with movement of the housing 3 and support 1 and thereby automatically focuses the lens 10 in accordance with the outline of cam 25. When instead of lens 10 the lens 9 having a different focal length is to be used, the previously mentioned sharp focusing system has to be disconnected. This is performed by turning knob 23 and the eccentric 21 connected therewith by means of the shaft 22, whereupon the eccentric 21 occupies the non-operative position shown in Fig. 3. During this movement the lens carrier 5 is lowered by its own weight until its pin 14 lies on the toggle lever 15. The cam 18 provides for sharp focusing of the lens 9 and thereafter controls the relative up and down movement of the carrier 5 in respect to the housing 3 so that the device is automatically focused for all positions of vertical motion of the support 1.

By the simple changing over of the eccentric 21 automatic sharp focusing of both lenses and simultaneous compensation of the difference in focal length at all positions of vertical adjustment is therefore ensured.

The invention is not restricted to the preceding example, but can be applied also if more than two lenses are used, by assigning an automatic sharp focusing device to each lens and causing connection and disconnection of them for instance by means of a double or repeatedly acting eccentric.

To make enlargements for which the vertical adjustment of the enlarging system or of the support 1 is not sufficient, the entire arrangement may be swung radially about the column 2 which for this purpose is rotatably disposed. For such enlargements it may be necessary to couple the lens carrier immovably with the mount. This can be done by arranging on the support 1, preferably at a point that can be easily reached, a member 26 having the form of a latch, lock or snapper, which by the action of a spring (not shown) reaches below the raised lens carrier 5 and disengageably couples it in this position to the negative support.

We claim:
1. A photographic reproducing apparatus comprising a substantially vertical, elongated supporting member, a projector housing mounted on said supporting member and reciprocable therealong, a plurality of cam members fixedly disposed along at least a portion of said supporting member, guide rod means depending from said projector housing, a lens carrier slidable along said guide rod means, a lens control head having a plurality of angularly spaced lenses thereon, said control head being pivotally mounted on said carrier and movable about its pivot whereby to position a selected one of said lenses in an operative position, a crank for each of said plurality of lenses, each of said cranks focusing the lens respectively associated therewith and being pivotally mounted on said projector housing, each of said cranks having one arm engageable with a portion of said lens carrier to raise and lower said lens carrier in accordance with the pivoting movement thereof and another arm simultaneously engageable with a respective cam member and pivotally movable thereby, said cranks being rotatable about their pivots under the control of the associated cams when said projector housing is raised and lowered whereby to focus the selected one of said lenses, and means to move the crank arms associated with the unselected ones of said lenses to a nonoperative position.

2. A photographic reproducing apparatus comprising a substantially vertical supporting member, a projector housing mounted on said supporting member and movable upwardly and downwardly therealong, first and second cam members fixedly disposed along at least a portion of said supporting member, a guide rod depending from said projector housing, a lens carrier slidable upwardly and downwardly along said guide rod, a lens control head having first and second angularly spaced lenses thereon, said lens control head being pivotally mounted on said carrier and movable about its pivot whereby to selectively position said first and said second lens in an operative position, a first crank arm for focusing said first lens pivotally mounted on said projector housing and having one arm engageable with said first cam member and another arm simultaneously engageable with a portion of said lens carrier, a second crank arm for focusing said second lens pivotally mounted on said projector housing and having a first arm engageable with said second cam member and a second arm simultaneously engageable with a portion of said lens carrier, said first and second crank arms being rotatable about their respective pivots under the control of their associated cams when they are in an operative position and when said projector housing is raised and lowered whereby to focus the selected one of said lenses, and means for moving one of said first and second crank arms to a non-operative position with one of the arms out of contact with a portion of said lens carrier.

3. A photographic reproducing apparatus according to claim 2, wherein said means for moving one of said crank arms to a non-operative position includes an eccentric, said first crank arm being pivotally mounted on said eccentric, and means to rotate said eccentric.

4. A photographic reproducing apparatus according to claim 2, wherein said means for moving one of said crank arms to a non-operative position includes an eccentric mounting for one of said arms.

5. A photographic reproducing apparatus according to claim 2, wherein said lens carrier includes a pin extending laterally on each side of said carrier, and wherein said first crank arm is in engagement with one of said pins and said second crank arm is engageable with the other one of said pins.

References Cited in the file of this patent

UNITED STATES PATENTS

| 2,043,970 | Luz | June 9, 1936 |
| 2,321,697 | Moulin | June 15, 1943 |
| 2,469,009 | Simmon | May 3, 1949 |
| 2,529,507 | Ludwig | Nov. 14, 1950 |
| 2,889,741 | Luz | June 9, 1959 |

FOREIGN PATENTS

| 706,640 | Germany | May 31, 1941 |
| 750,967 | Germany | Dec. 22, 1952 |
| 935,632 | France | Feb. 2, 1948 |
| 965,524 | France | Feb. 15, 1950 |